July 24, 1934.   B. N. WALLIS   1,967,795
CANTILEVER WING FOR AIRCRAFT
Filed Aug. 9, 1933   3 Sheets-Sheet 1
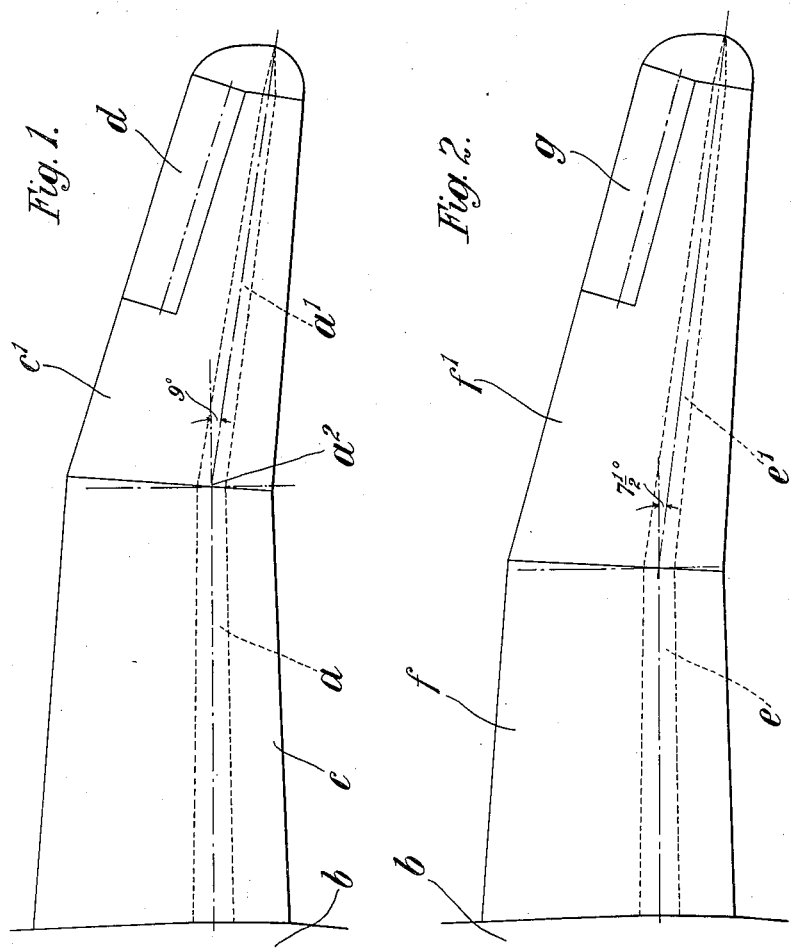

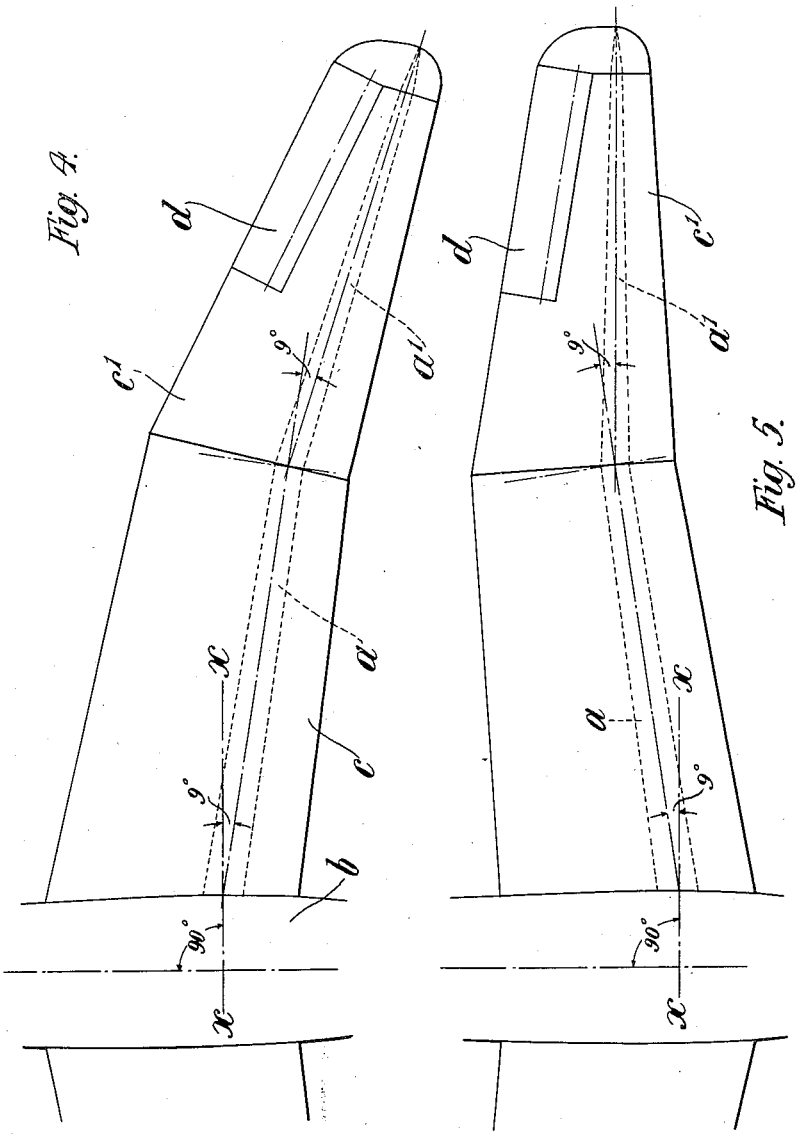

Patented July 24, 1934

1,967,795

UNITED STATES PATENT OFFICE 1,967,795

CANTILEVER WING FOR AIRCRAFT

Barnes Neville Wallis, Weybridge, England, assignor to Vickers (Aviation) Limited, Weybridge, England Application August 9, 1933, Serial No. 684,443
In Great Britain September 7, 1932

5 Claims. (Cl. 244—12)

This invention relates to cantilever wings for aircraft and most particularly to that type in which each wing is carried on a single spar projecting laterally outwards from the longitudinal axis of the machine, lateral control of the aircraft being maintained by means of hinged flaps or ailerons situated towards the outboard ends of the wings and hinged at or near the trailing edge.

It has been found in the past that with wings of this type it is difficult to maintain lateral control of the aircraft at high speeds owing to the fact that the centre of pressure of the forces applied to the wings by the ailerons is situated so far behind the main spar or torsional axis of the wing structure as to impose a twisting moment on the latter large enough to modify the angle of incidence of the wing to the air stream, by this means changing the lift distribution over the two wings in such a manner as to reduce lateral control instead of augmenting it.

The object of this invention is so to construct such wings that the centre of pressure of the forces applied by use of the aileron lies in or in front of the torsional axis of the wing structure.

According to this invention, arrangements are made by means of which the outboard portion of the wing carrying the aileron is swept forward in plan or in a plane which contains the chord of the aerofoil relative to the inboard portion of the wing.

With such an arrangement there is a change in direction in which the wing extends between its outboard and its inboard ends, the outboard portion extending at an angle to the inboard portion. By this means the centre of pressure of the forces applied when the aileron is adjusted, more particularly the aileron which is turned downwards, may be brought into line with or in front of the torsional axis of the wing. It is generally found impossible to forecast with any accuracy the position of the centre of pressure of such applied forces either from theoretical considerations or from the results of wind tunnel experiments. A further feature of this invention therefore provides a means whereby the foresweep of the wing may be made adjustable so that the effect desired may be obtained without the uncertainty which at present exists in this respect.

The effect of sweeping the torsional axis of the wing structure forward, until the centre of pressure of the forces applied by the aileron lie in front of the torsional axis of the inboard portion of the wing, is that the twisting moment imposed on this portion of the wing is of opposite sign to that which is imposed on the outboard portion of the wing in the case where the aileron has its angle of incidence increased. This effect can be controlled according to this invention until the twisting moment imposed by the aileron control tending to reduce lateral control is neutralized, or actually transformed into a twisting moment tending to augment lateral control.

As applied to a single spar wing, the spar extends outwards from the fuselage with its axis in a straight line, and then at the outboard end of the wing, the spar is bent forward. The wing contained on this forwardly bent portion of the spar follows the direction imposed by the spar, with the result that the aileron becomes located more forwardly than would be the case had the spar continued in a straight line to its outer end. The extent of bend or forward change in axial direction of the spar, and the proportion of spar extending beyond the bend, determine the location of the aileron, and thus the choice of neutralizing or reversing the twisting effect exerted by the aileron under the air forces and gravity forces imposed on it by controls or by air bumps. As a general rule such a proportion of the outboard portion should be swept forward through such an angle in plan as will bring the centre of pressure of the applied force on or forward of the torsional axis of the inboard portion of the wing.

The invention will now be described by way of example with reference to the single spar arrangements illustrated upon the accompanying drawings, in which:—

Fig. 1 is a plan view of a wing constructed according to this invention.

Fig. 2 is a similar view to Fig. 1 but illustrating a modification.

Figs. 4 and 5 are similar views to Fig. 1, illustrating alternative arrangements.

Figure 3:
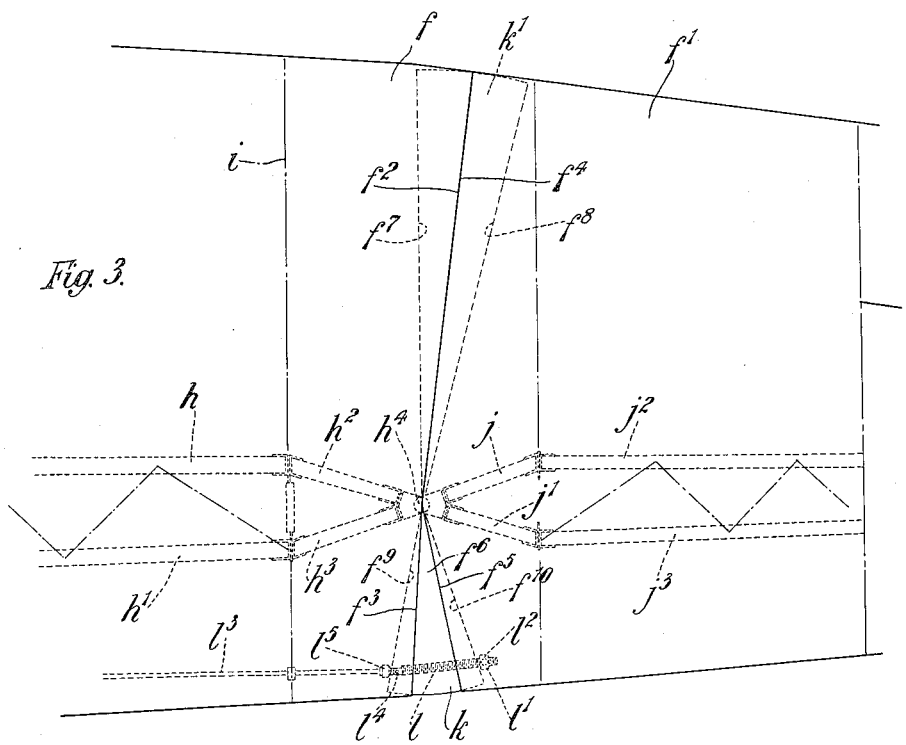
Fig. 3 is a fragment of the wing on an enlarged scale, illustrating the means whereby the outboard portion may be adjusted relatively to the inboard portion.

In the construction shown in Fig. 1, the inboard portion $a$ of the spar extends outwardly from the fuselage $b$ with its axis at right angles to the longitudinal axis of the latter, while the outboard portion $a^1$ of the spar is bent forwardly with its axis at an angle of 9° relatively to the axis of the inboard portion. The inboard portion of the spar $a$ supports an inboard portion $c$ of the wing which follows the direction of the inboard portion of the spar, while the outboard portion of the wing $c^1$ contained on the forwardly bent outboard portion of the spar follows the change in direction imposed by the angle of this portion of the spar. The aileron $d$ carried on the outboard portion of the wing will, as is clearly seen from the drawing, be located more forwardly relatively to the torsional axis of the inboard portion of the wing, which in this case is the axis of the inboard portion of the spar.

In this Fig. 1 construction the spar extends out from the fuselage to a point $a^{22}$ in the semi-span nearer the wing tip than the centre line of the aircraft and comprising the greater part of the span of the wing. It has been found, however, that the length of the inboard portion may be reduced, as shown in Fig. 2, where $e$ indicates the reduced inboard portion of the spar and $f$ the reduced inboard portion of the wing and that of the outboard portion may be increased as shown, where $e^1$ indicates the increased outboard portion of the spar and $f^1$ the increased outboard portion of the wing. In this case the angle of the axis of the outboard spar portion $e^1$ relative to the axis of the inboard spar portion $e$ is reduced to $7\frac{1}{2}°$, while obtaining approximately the same position for the aileron $g$ as that of Fig. 1.

The wing may be constructed with the outboard portion of the spar and wing fixed in relation to the inboard portion, but in view of the impossibility or difficulty of forecasting accurately the position of the centre of pressure of the applied forces, the outboard portion may be adjustable as shown in Fig. 3, so as to secure the desired effect. Fig. 3 illustrates the junction between the outboard portion of the spar and wing with the inboard portion of the spar and wing. This figure shows the upper booms $h$, $h^1$ of a single spar which carry on the end rib $i$ of the fixed inboard portion $f$ of the wing a triangular frame comprising the members $h^2$, $h^3$, carrying a joint $h^4$ to which is hingedly connected a corresponding frame comprising members $j$, $j^1$ carried by the booms $j^2$, $j^3$ of the inboard portion of the spar. These booms and frames are duplicated near the lower surface of the wing and provide the necessary deep hinge joint for the secure attachment of the outboard spar portion to the inboard spar portion and yet permit of the necessary adjustment of the axis of the outboard spar relatively to the axis of the inboard spar. To permit of adjustment of the outboard portion of the wing with its spar, the inboard portion $f$ of the wing is cut away at $f^2$, $f^3$ and the outboard portion $f^1$ is cut away at $f^4$ and $f^5$ in such a manner that when the outboard portion is in its rearmost position relatively to the inboard portion, as shown in Fig. 3, a gap $f^6$ is left between the ends $f^3$ and $f^5$. This gap is closed by a floating filler piece $k$ which is rockably mounted on the joint $h^4$ and is provided with a similar closure portion $k^1$ extending rearwardly and contained in recesses $f^7$, $f^8$ in the trailing portion of the wing which acts to close the gap between the ends $f^2$, $f^4$ when the outboard wing portion is adjusted forwardly of its Fig. 3 position. It will be understood that the filler portions $k$ and $k^1$ are shaped to correspond with the cross-section of the wing but have their leading and trailing edges in the shape of an arc struck from the centre of the joint $h^4$ in order to fit closely within the wing portions in any position to which the outboard portion of the wing and the floating filler piece may be adjusted. Recesses $f^9$, $f^{10}$ are provided in the adjacent ends $f^3$, $f^5$ at the leading portion of the wing to accommodate the filling piece $k$ when the outboard portion of the wing is adjusted forwardly of the position shown in Figs. 3. Means will be provided to ensure that the filler piece is retained in a position in which it completely closes the gap between the wing portions.

Adjustment and maintenance of the outboard portion at the required angle relatively to the inboard portion may be effected by any suitable means such as, for example, the screw $l$ arranged to screw into a nut $l^1$ formed in a swivel bearing $l^2$ attached to the outboard wing portion $f^1$, said screw being rotated from the pilot's cockpit by means of the rod $l^3$ to which it is connected by a universal joint $l^4$. The rod $l^3$ is rotatably but non-slidably mounted in a bearing $l^5$ attached to the fixed inboard wing portion $f$.

Instead of arranging the inboard portion of the spar with its axis at right angles to the longitudinal axis of the fuselage, as shown in Fig. 1, the axis of this inboard spar portion $a$ may be inclined forwardly at an angle of, say, 9° to the perpendicular $x$—$x$ to said longitudinal axis, as shown in Fig. 4, in which case the axis of the outboard spar portion $a^1$ is, as before, inclined forwardly at, say, 9° relatively to the inboard spar portion and the inboard and outboard wing portions $c$, $c^1$ swept forward to suit the spar. Alternatively, the axis of the inboard spar portion $a$ may be inclined backwardly at an angle of, say, 9° relatively to the perpendicular to the longitudinal fuselage axis as shown in Fig. 5, the axis of the outboard spar portion $a^1$ being again inclined forwardly relatively to the inboard spar axis by the same 9°. In this case the inboard wing portion $c$ is swept backwardly to suit the inboard portion of the spar.

What I claim as my invention and desire to secure by Letters Patent is:—

1. A cantilever wing for aircraft consisting of a single spar having an inboard spar portion fixed to extend in a straight line outwardly from the fuselage and having an outboard spar portion fixed to the inboard spar portion, two wing portions—an inboard wing portion fixed on the inboard spar portion and an outboard wing portion fixed to the outboard spar portion—and an aileron at the trailing edge of the outboard wing portion, the whole of said outboard spar and wing portions being arranged at a forwardly inclined position to said inboard spar and wing portions.

2. A cantilever wing for aircraft consisting of a single spar having an inboard spar portion fixed to extend in a straight line outwardly from the fuselage and having an outboard spar portion fixed to the inboard spar portion, two wing portions—an inboard wing portion of complete wing section adapted to be fixed on the inboard spar portion and an outboard wing portion of complete wing section fixed to the outboard spar portion—and an aileron at the trailing edge of the outboard wing portion, the whole of said outboard spar and wing portions being arranged at a forwardly inclined position relatively to said inboard spar and wing portions.

3. A cantilever wing for aircraft consisting of an inboard wing portion fixed to extend outwardly from the fuselage and having a straight torsional axis, an outboard wing portion forward swept relatively to the inboard portion with its torsional axis inclined forward relative to the torsional axis of the inboard portion and an aileron located at the trailing edge of said outboard portion.

4. A cantilever wing for aircraft consisting of an inboard wing portion fixed to extend outwardly from the fuselage, an outboard wing portion forward swept relatively to said inboard wing portion with its torsional axis inclined forward relatively to the torsional axis of the inboard portion and an aileron located at the trailing edge of said outboard wing portion, one of said portions extending forwardly of the other portion.

5. A cantilever wing for aircraft consisting of an inboard wing portion fixed to and extending outwardly from the aircraft fuselage, an outboard wing portion forward swept relatively to the inboard portion with its torsional axis inclined forward relatively to the torsional axis of the inboard portion and an aileron located at the trailing edge of the outboard portion, said forward swept outboard wing portion extending forwardly of the inboard portion of the wing.

BARNES NEVILLE WALLIS.